May 5, 1953
C. A. SHUTTLEWORTH
2,637,433
CONTAINER HANDLING CONVEYER
Filed Dec. 9, 1950
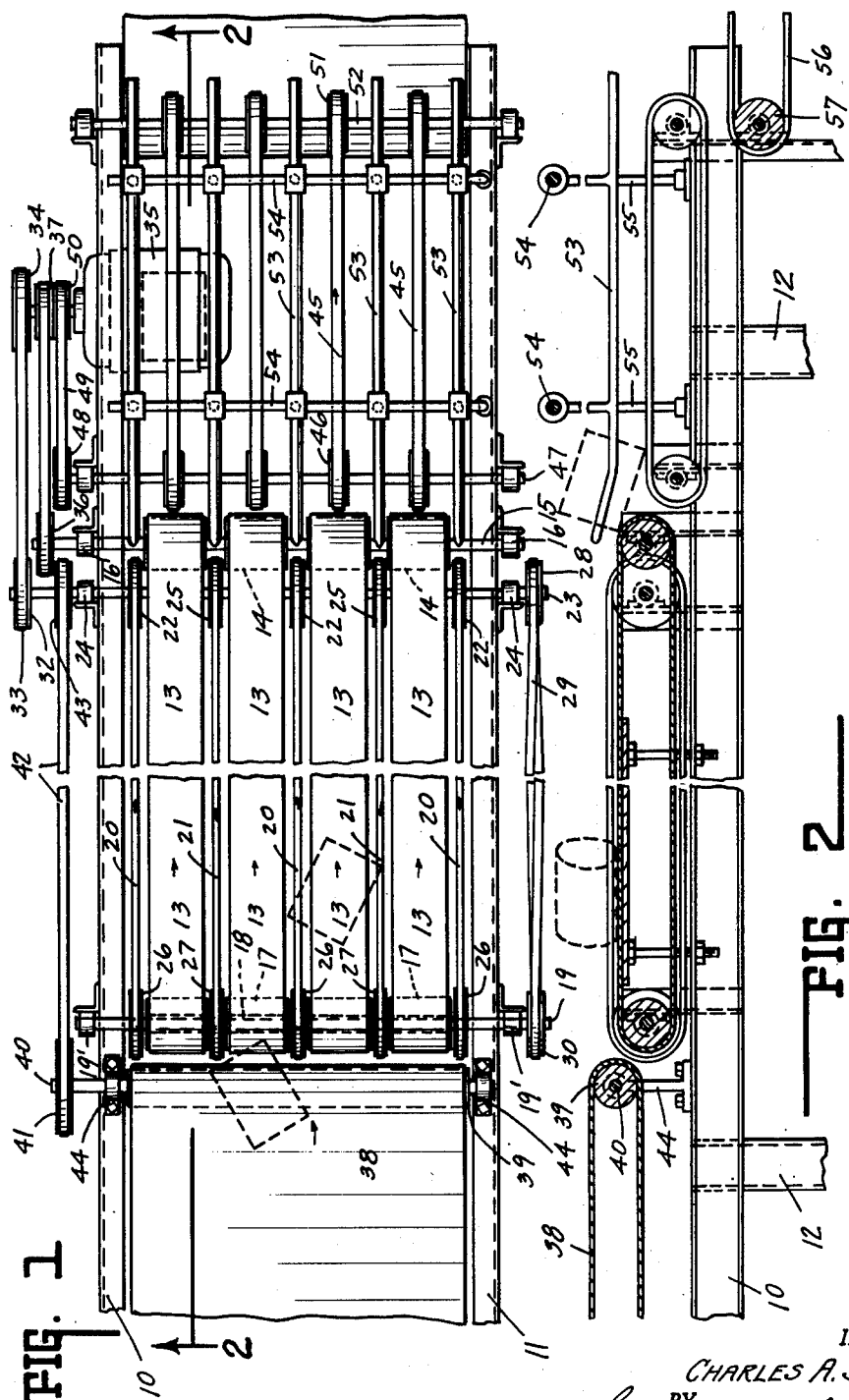
INVENTOR.
CHARLES A. SHUTTLEWORTH
BY
Lockwood, Hahn, Galt & Woodard.
ATTORNEYS.

Patented May 5, 1953

2,637,433

UNITED STATES PATENT OFFICE 2,637,433

CONTAINER HANDLING CONVEYER

Charles A. Shuttleworth, Warren, Ind.

Application December 9, 1950, Serial No. 199,983

6 Claims. (Cl. 198—33)

The present invention relates to container handling conveyors and has particular reference to a conveying means primarily adapted for handling cans.

One of the objects of the invention is to provide means which while advancing cans and similar articles will arrange the cans with their vertical axes all in the same direction irrespective of the direction of the axes of the cans when they are deposited on the conveyor.

Other objects and advantages of the invention will appear more fully hereinafter.

The full nature of the invention will be understood from the accompanying drawings and the following description and claims:

In the drawings;

Fig. 1 is a plan view of a conveyor embodying my invention.

Fig. 2 is a sectional view taken on the lines 2—2 of Fig. 1.

In the structure illustrated I provide a frame which may consist of a pair of channel iron side members 10 and 11 suitably supported on vertically disposed posts or legs 12 which may be located at spaced intervals.

A plurality of supporting conveyors 13 which may consist of a series of transversely spaced apart iron belts operate at one end on rollers 14 on a shaft 15 mounted in suitable bearings 16 supported on the side members 10 and 11 of the frame. These belts likewise operate over suitable rollers 17 mounted on sleeves 18 in turn rotatably mounted on a shaft 19 suitably supported in bearings 191 on the side members 10 and 11. The rollers 14 are fixed upon and driven from the shaft 15 while the rollers 17 being mounted on the sleeve 18 are rotatably mounted on the shaft 19.

Adjacent each side of the supporting conveyors 13 travel pairs of straightening conveyors 20 and 21. The straightening conveyors 20 operate over pulleys 22 fixed on a shaft 23 mounted in suitable bearings 24 on the side members 10 and 11. The straightening conveyors 21 operate on pulleys 25 rotatably mounted on the shaft 23. The opposite ends of the straightening conveyors 20 are carried by pulleys 26 which are rotatably mounted on the shaft 19 while the opposite ends of the straightening conveyors 21 operate on pulleys 27 rotatably fixed to the shaft 19. The shaft 23 at one end is provided with a driving pulley 28 which drives a crossed belt 29 in turn driving a driven pulley 30 fixed on the shaft 19.

It should be noted that the pulleys for the straightening belts 20 and 21 are considerably larger in diameter than the pulleys for the conveyor belts 13 and as a result although the axes of the shafts of these pulleys are in horizontal alignment the straightening belts operate at a higher level than the level of the conveyors 13.

The shaft 23 is provided with a driving pulley 32 driven by a belt 33 from a pulley 34 mounted on the shaft of a driving motor 35. The shaft 15 is provided with a driving pulley 36 driven from a pulley 37 on the shaft of the driving motor 35. The relative sizes of the pulleys 33 and 36 and 34 and 37 are such that the straightening belts 20 and 21 are driven at a considerably greater lineal speed than the lineal speed of the conveyors 13.

For delivering the containers to the conveyor belts 13 I provide a suitable conveyor apron 38 which passes over roller 39 mounted on a shaft 40 supported in suitable bearings on the side members 10 and 11 and this apron is driven through the medium of a pulley 41 fixed on the shaft 40 having a belt connection 42 with a pulley 43 mounted on the shaft 23.

It is to be noted that the bearings for the shaft 40 are mounted on uprights 44 which raise the roller 39 and accordingly the delivery end of the belt 38 somewhat above the horizontal level of the conveyors 13. However, this elevation is somewhat less than the height of a can or other containers to be handled so that as the can is delivered to the conveyor belts 13 it will never be dropped in such a manner as to assume a vertical or upright position.

The width of the conveyor belts 13 is less than the length of the cans or other conveyors to be handled. Accordingly, as the cans, and for convenience, the containers will always hereinafter be referred to as cans, are delivered from the delivery conveyor 38 on to the conveyor belts 13, if any of the cans happen to be delivered with their vertical axes extending transversely to the line of travel of the belts 13, the ends of the cans lying across the belts will come in contact with the straightening conveyors 20 and 21 or with one of the same. With the straightening conveyor 20 travelling at a greater speed and in the direction of the conveyor belt 13, there will be a tendency to throw that end of the can in contact with the belt 20 in a straightening direction and with the straightening belt 21 travelling in the opposite direction, if the can should be lying in a position with its end in contact with the straightening conveyor 21 the end will be kicked over onto the conveyor belt 21.

As a result of the action of the belts 20 and 21 or either of the same the cans which might have been deposited with their axes extending transversely or at an angle to the line of travel of the conveyor belts 13 will be straightened out so that their vertical axes are in alignment with the line of travel.

After the cans have been straightened out on the belt 13 they will be deposited on removal belts or take-off belts 45, one for each of the conveyor belts 13. These belts run over their respective pulleys or rollers 46 at one end, which are mounted upon a shaft 47 driven through a driving pulley 48 belted as at 49 to a pulley 50 on the shaft of the driving motor 35.

The opposite end of the belts travel over rollers 51 mounted on a shaft 52. These take-off belts 45 are comparatively narrow but the can is maintained against tilting of the same through the medium of pairs of guide rails 53, disposed above and on the opposite sides of the belts 45. These guide rails are approximately the width of the diameter of the cans so that the can is prevented from rolling while on the narrow take-off conveyor belts 45. The guide rails are supported on cross bars 54 suitably supported in standards 55 mounted on the side rails 10 and 11.

These take-off conveyors 45, it will be noted, are disposed at a lower horizontal level than the horizontal level of the conveyors 13 and if desired this level may be so adjusted that it is approximately equal to the height of the can so that the cans as they are delivered from the conveyors 13 onto the conveyors 45 will be tilted to be supported on the conveyors 45 in an upright position. Under these circumstances the guide rails 53 would, of course, prevent the cans from tilting.

It is to be noted that the conveyor belts 13 are less in width than the length of the container or containers to be handled thereby. This arrangement, therefore, will permit the straightening belts 20 and 21 to engage the ends of a container in event it is cocked on the belt 13 and straighten the same so that its vertical axis lies parallel to the direction of travel of the conveyor belt 13.

In the event it is not desired to deliver the cans to the take-off conveyors 45 in an upright position the differential between the height of the conveyors 13 and the conveyors 45 need not be so great as to cause the can to tilt in a vertical position when delivered onto the conveyors 45. Under these circumstances it may be desired to deliver the cans in an upright position to the final conveyor and in this instance the final conveyor 56 riding over pulley 57 at one end, is located at a sufficiently low level so that when the cans drop off the can 45 they will drop into an upright position.

The invention claimed is:

1. In a container handling conveyor the combination with a supporting conveyor having a width slightly less than the height of the container to be handled of a pair of straightening conveyors disposed on opposite sides of said supporting conveyor and travelling in opposite directions at a lineal speed different than the lineal speed of the supporting conveyor.

2. In a container handling conveyor the combination with a supporting conveyor of a width slightly less than the height of the article to be conveyed thereon, of a straightening conveyor disposed at one side of and at a level higher than the level of the supporting conveyor and travelling at a lineal speed different than the lineal speed of the supporting conveyor.

3. In a container handling conveyor the combination with a supporting conveyor having a width slightly less than the height of the container to be handled thereby, of a straightening conveyor disposed on one side of said supporting conveyor at a height above the height of the supporting conveyor and travelling in a direction opposite to the direction of the travel of the supporting conveyor.

4. In a container handling conveying means the combination with a supporting conveyor each of which has a width slightly less than the height of the container to be conveyed thereby, a pair of straightening conveyors disposed on opposite sides of said supporting conveyor and travelling in opposite directions, the speed of the straightening conveyor moving in a direction coincident with the direction of travel of the supporting conveyor being different than the speed of the supporting conveyor, and a delivery conveyor disposed in advance of said supporting conveyors and having an elevation above said supporting conveyors less than the height of a container to be handled.

5. In a container handling apparatus the combination of a plurality of supporting conveyors disposed adjacent to one another, each of said conveyors having a width less than the height of the containers to be handled thereby, a pair of straightening conveyors disposed on opposite sides of each of said supporting conveyors and travelling in opposite directions, the lineal speed of the straightening conveyor travelling in the direction of travel of the supporting conveyors being different, a delivery conveyor disposed at one end of said supporting conveyors, a plurality of receiving conveyors disposed at the opposite end of said supporting conveyors, one for each of said supporting conveyors, and pairs of spaced apart guide rails disposed above each of said receiving conveyors.

6. In a container handling conveyor, the combination with a supporting conveyor having a width slightly less than the height of the container to be handled, a pair of straightening conveyors disposed on opposite sides of said supporting conveyor, means for driving said supporting conveyor, and means for driving one of said straightening conveyors in the opposite direction to said supporting conveyor and the other straightening conveyor in the same direction as the supporting conveyor at a greater lineal speed.

CHARLES A. SHUTTLEWORTH.

References Cited in the file of this patent

UNITED STATES PATENTS

| Number | Name | Date |
|---|---|---|
| 586,866 | Potter | July 20, 1897 |
| 1,341,238 | Mason | May 25, 1920 |
| 1,616,101 | Ackley | Feb. 1, 1927 |
| 1,754,047 | Reaves | Apr. 8, 1930 |